(12) United States Patent
Weaver et al.

(10) Patent No.: US 11,301,437 B2
(45) Date of Patent: Apr. 12, 2022

(54) MILESTONES IN FILE HISTORY TIMELINE OF AN ELECTRONIC DOCUMENT

(71) Applicant: Microsoft Technology Licensing, LLC, Redmond, WA (US)

(72) Inventors: Joan Catharine Weaver, Somerville, MA (US); Douglas Lane Milvaney, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 15/950,281

(22) Filed: Apr. 11, 2018

(65) Prior Publication Data

US 2019/0318007 A1    Oct. 17, 2019

(51) Int. Cl.
| | | |
|---|---|---|
| *G06F 16/18* | (2019.01) | |
| *G06F 40/197* | (2020.01) | |
| *G06F 3/0484* | (2013.01) | |

(52) U.S. Cl.
CPC ........ *G06F 16/1873* (2019.01); *G06F 40/197* (2020.01); *G06F 3/0484* (2013.01)

(58) Field of Classification Search
USPC ........................................................ 707/695
See application file for complete search history.

(56) References Cited

U.S. PATENT DOCUMENTS

| | | |
|---|---|---|
| 6,289,368 B1 | 9/2001 | Dentler et al. |
| 6,918,082 B1 * | 7/2005 | Gross ..................... G06Q 10/10 715/206 |
| 7,444,598 B2 | 10/2008 | Horvitz et al. |
| 2005/0022113 A1 * | 1/2005 | Hanlon ................. G06F 16/182 |
| 2005/0055625 A1 | 3/2005 | Kloss |
| 2007/0255715 A1 | 11/2007 | Li et al. |
| 2007/0271303 A1 | 11/2007 | Menendez et al. |
| 2011/0202574 A1 | 8/2011 | Iwase |

(Continued)

FOREIGN PATENT DOCUMENTS

WO    2015105645 A1    7/2015

OTHER PUBLICATIONS

"International Search Report and Written Opinion Issued in PCT Patent Application No. PCT/US2019/024163", dated Jun. 25, 2019, 14 Pages.

(Continued)

*Primary Examiner* — Muluemebet Gurmu
(74) *Attorney, Agent, or Firm* — Rainier Patents, P.S.

(57) ABSTRACT

Described herein is a system and method for creating a milestone associated with a version of an electronic file. A milestone creation input associated with the particular version of the electronic file is received. Milestone content to be associated with the particular version of the electronic file is further received. The milestone content is stored, and, the stored milestone content and the particular version of the electronic file are associated. Further described herein is a system and method for using a milestone associated with a version of an electronic file. Milestone indicator(s) are displayed, each milestone indicator associated with a milestone of a version of an electronic file. A selection of a particular milestone indicator is received. Milestone content associated with the selected particular milestone indicator is presented. The milestones can be searchable.

20 Claims, 9 Drawing Sheets

(56) References Cited

U.S. PATENT DOCUMENTS

| | | | | |
|---|---|---|---|---|
| 2013/0067333 | A1* | 3/2013 | Brenneman | G11B 27/105 715/721 |
| 2014/0033088 | A1* | 1/2014 | Shaver | G06F 40/197 715/764 |
| 2015/0363718 | A1* | 12/2015 | Boss et al. | G06Q 10/0633 705/7.27 |
| 2016/0189753 | A1* | 6/2016 | Mangold et al. | G06F 16/182 707/638 |
| 2017/0024445 | A1 | 1/2017 | Schoppe et al. | |
| 2017/0199915 | A1* | 7/2017 | McNeill et al. | H04M 3/5307 |
| 2018/0034879 | A1* | 2/2018 | Chegini | G06F 3/1238 |

OTHER PUBLICATIONS

"Collaborate on Word documents with Real-Time Co-Authoring", Retrieved from <<https://support.office.com/en-US/article/Collaborate-on-Word-documents-with-real-time-co-authoring-7dd3040c-3f30-4fdd-babO-8586492a1f1d>>, Retrieved on: Feb. 19, 2018, 3 Pages.

"Collaborating On Files", Retrieved from <<https://dev.liferay.com/discover/portal/-/knowledge_base/7-0/collaborating-on-files>>. Retrieved On: Feb. 19, 2018, 4 Pages.

"Creating a Milestone", Retrieved from <<http://documentation.caseware.com/2012/WorkingPapers/en/Content/File_Maintenance/History/Milestones/Creating_a_milestone.htm<<, Retrieved on: Feb. 19, 2018, 1 Page.

"History and Milestones", Retrieved from <<https://web.archive.org/web/20170818162055/http:/documentation.caseware.com/2012/WorkingPapers/en/Content/File_Maintenance/History/Introduction_to_milestones.htm>>. Aug. 18, 2017, 1 Page.

"Working Papers", Retrieved from <<https://www.caseware.com/us/products/working-papers>>, Retrieved on: Feb. 21, 2018, 4 Pages.

Thernström, Pär, "Simple History", Retrieved from <<https://web.archive.org/web/20151201051120/https:/wordpress.org/plugins/simple-history/>>, Dec. 1, 2015, 6 Pages.

* cited by examiner

MILESTONES IN FILE HISTORY TIMELINE OF AN ELECTRONIC DOCUMENT

BACKGROUND

Word processing, spreadsheet, database, slide presentation, electronic mail, drawing, note taking, web browser, media player, and game applications allow users to consume, create, and/or edit documents (e.g., electronic files). During the editing process, the documents can change many times resulting in one of more versions of the documents. A file history presents information regarding version(s) of electronic files (e.g., automatically saved).

SUMMARY

Described herein is a system for creating a milestone associated with a version of an electronic file, comprising: a computer comprising a processor and a memory having computer-executable instructions stored thereupon which, when executed by the processor, cause the computer to: receive a milestone creation input associated with the particular version of the electronic file; receive milestone content to be associated with the particular version of the electronic file; store the milestone content; and, associate the stored milestone content and the particular version of the electronic file.

Further described herein is a method for using a milestone associated with a version of an electronic file, comprising: displaying one or more milestone indicators, each milestone indicator associated with a milestone of a version of an electronic file; receiving a selection of a particular milestone indicator; and presenting milestone content associated with the selected particular milestone indicator.

Also described herein is a computer storage media storing computer-readable instructions that when executed cause a computing device to: receive a search query related to stored milestones, each milestone associated with a version of an electronic file; search the stored milestones for milestones satisfying the search query; and present at least one milestone satisfying the search query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
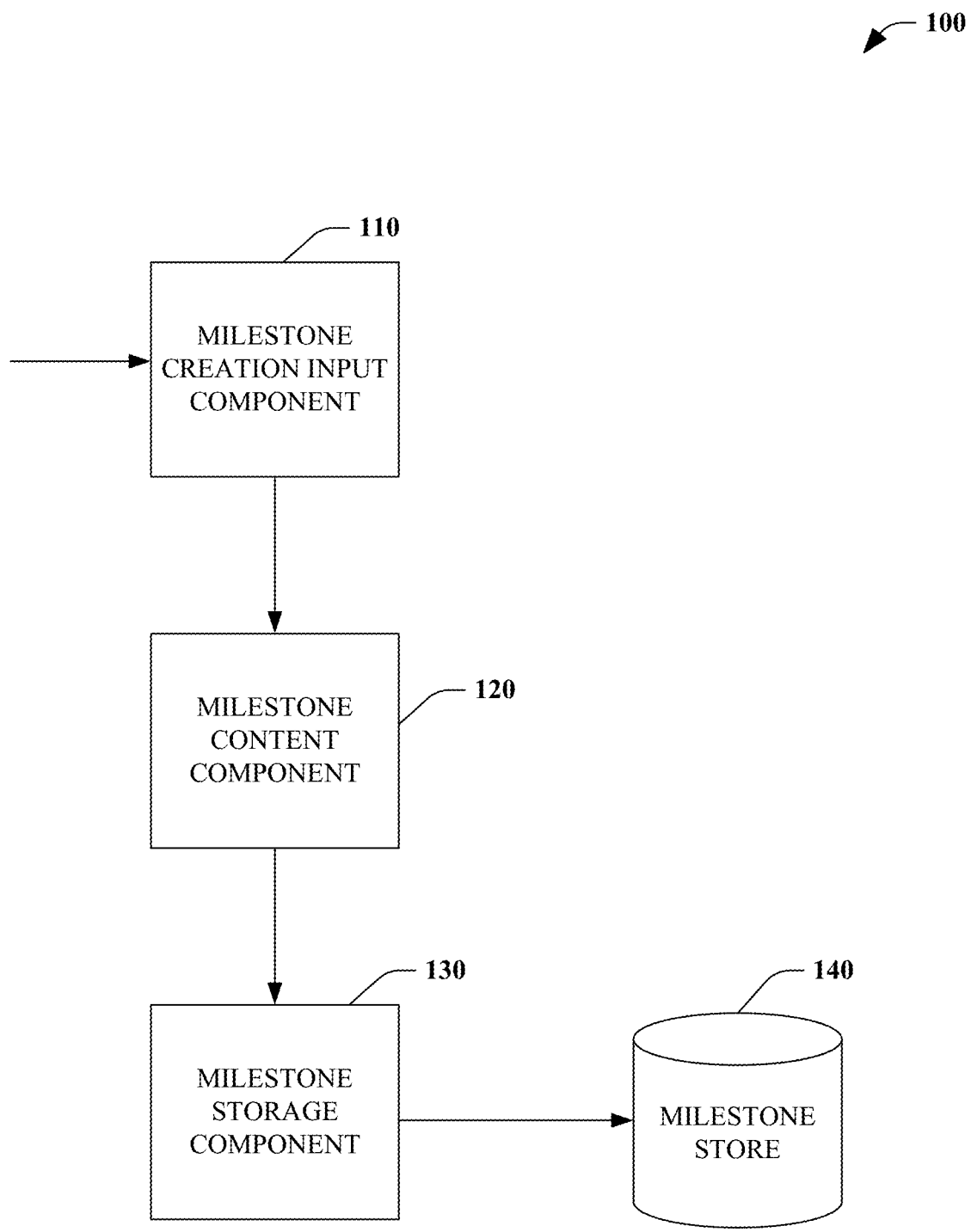
FIG. 1 is a functional block diagram that illustrates a system for creating a milestone associated with a version of an electronic file.

Various technologies pertaining to creation and/or utilization of milestone(s) (e.g., user-created) for version(s) of electronic file(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding creation and/or utilization of milestone(s) (e.g., user-created) for version(s) of electronic file(s). What follows are one or more exemplary systems and methods.

Aspects of the subject disclosure pertain to the technical problem of creating and/or utilizing milestone(s) (e.g., user-created) for version(s) electronic file(s). The technical features associated with addressing this problem involve receiving a milestone creation input (e.g., explicitly and/or implicitly) associated with a particular version of an electronic file, receiving milestone content (e.g., text, electronic file, audio file, image file, video file and the like) to be associated with the particular version of the electronic file, storing the milestone content associated with the particular file, and, associated with the stored milestone content and the particular version of the electronic file. The technical features further include displaying one or more milestone indicators, each milestone indicator associated with a milestone of a version of an electronic file; receiving a selection of a particular milestone indicator; presenting milestone content associated with the selected particular milestone indicator. Accordingly, aspects of these technical features exhibit technical effects of more efficiently and effectively increasing user efficiency and/or reducing network bandwidth, as users can obtain information in a more efficient manner.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Referring to FIG. 1, a system for creating a milestone associated with a version of an electronic file 100 is illustrated. In some embodiments, the system 100 can be utilized by a user to add milestone(s) (e.g., activity(ies)) in a history of an electronic file. In some embodiments, the history includes a list of version(s), date, time, and/or file-level activity(ies). In some embodiments, the system 100 allows a user to create milestone(s) at significant points in time, for example, when the electronic file is shared, renamed and/or restored from a previous version. The milestone(s) can thus allow a user to better understand significant time(s) in a life cycle of the electronic file.

In some embodiments, milestone(s) can be useful to user(s) in several scenarios. First, in some embodiments, in a scenario in which an unexpected event such as an accidental deletion by the user, a crash by the operating system and/or a change by an application associated with the electronic file, users still want to be able to readily access their content. Milestone(s) can allow users to select a particular version of the electronic file in a meaningful manner.

Second, in some embodiments, milestone(s) can be utilized as an archival mechanism. In some embodiments, one or more files can be associated with the electronic file through a milestone. For example, as discussed below, a document of notes regarding an electronic slide presentation can be associated with a version of the electronic slide presentation through a milestone associated with the version of the electronic slide presentation.

Third, in some embodiments, milestone(s) can be utilized as a communication mechanism. For example, a user can create a milestone of notes and/or audio regarding the version of the electronic file. The milestone can allow the user and/or other user(s) to readily review the milestone (e.g., notes, audio, etc.).

In some embodiments, milestone(s) can include text (e.g., notes) and/or rich content such as video file(s), audio file(s), image file(s), and/or attachment of other electronic file(s). By way of example and not limitation, the milestone(s) can include, a manager's emailed feedback, notes from a presentation of the version of the electronic file, notes about when the version of the file was submitted to a manager for review, another electronic file which was presented with the electronic file, a video file of feedback from a presentation, an audio file including a note regarding work status of the electronic file (e.g., when the user is ending work before a holiday break, etc.).

In some embodiments, the system 100 allows user(s) to mark-up (e.g., annotate) their version history to make it more understandable and/or user-friendly for the user and/or other(s) collaborating on the electronic file. In some embodiments, the system 100 allows user(s) to create significant milestone indicator(s) (e.g., meaningful information for users to reference when referring back to earlier version(s) of the electronic file).

The system 100 includes a milestone creation input component 110, a milestone content component 120, and a milestone storage component 130. The milestone creation input component 110 receives a milestone creation input associated with a particular electronic file.

Figure 2:
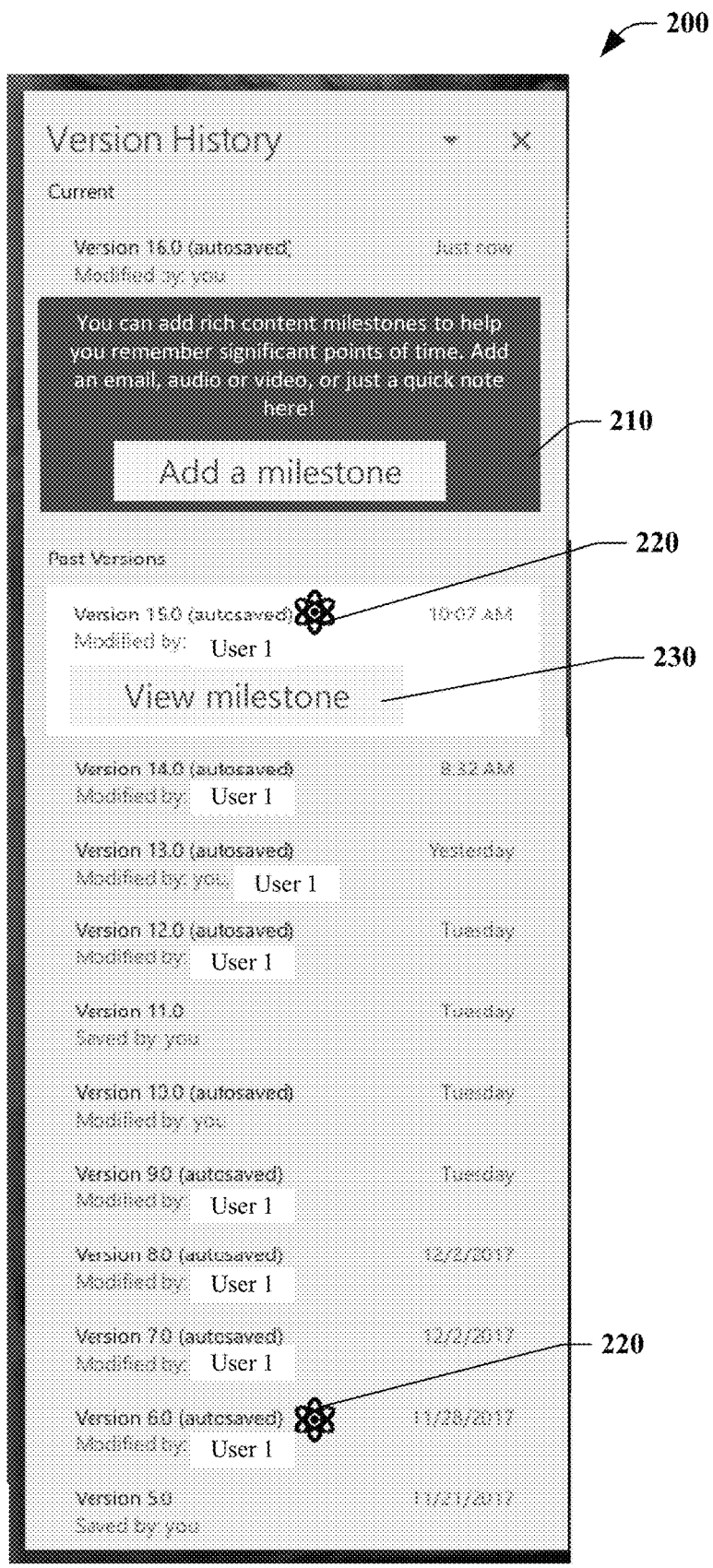
FIG. 2 is an illustration of an exemplary graphical user interface.

In some embodiments, the milestone creation input is received explicitly. Referring briefly to FIG. 2, an exemplary graphical user interface 200 is illustrated. The graphical user interface 200 includes an "Add a milestone" control 210. For example, using the graphical user interface 200 (e.g., a version history user interface), a user can select the "Add a milestone" control 210 to explicitly indicate the user's desire to add a milestone.

Referring back to FIG. 1, in some embodiments, the milestone creation input is received implicitly. In some embodiments, the milestone creation input component 110 can infer a user's desire to add a milestone based upon activity related to the file, for example, sharing the electronic file, renaming the electronic file, and/or restoring a previous version of the electronic file. In some embodiments, the milestone creation input component 110 can infer a user's desire to add a milestone based upon a user's activity, for example, in response to sending and/or receiving email related to an electronic file (e.g., document, electronic slide presentation, etc.). In some embodiments, the milestone creation input component 110 can infer a user's desire to add a milestone based upon a policy. The policy can store rule(s) for when a milestone is added, for example, upon expiration of a predetermined period of time, in response to a particular activity (e.g., printing of document), and the like.

In response to receipt of the milestone creation input, the milestone content component 120 receives milestone content. In some embodiments, the milestone content can include text (e.g., description of why the version of the electronic file is significant). In some embodiments, the milestone content can include one or more other electronic files. For example, through the milestone content 120, the system 100 can store other electronic file(s) (e.g., video file(s), audio file(s), image file(s), and/or attachment of other electronic file(s)). For example, for an electronic file comprising an electronic slide presentation, the milestone content can include a document of notes presented with the electronic slide presentation, an audio/video file of the electronic slide presentation as presented, email(s) received regarding the electronic slide presentation, etc.

In some embodiments, the milestone content can include reference(s) to one or more other electronic files (e.g., reference(s) to video file(s), audio file(s), image file(s), and/or attachment of other electronic file(s)). For example, for an electronic file comprising an electronic slide presentation, the milestone content can include reference(s) (e.g., file name and version information) to a document of notes presented with the electronic slide presentation, an audio/video file of the electronic slide presentation as presented, email(s) received regarding the electronic slide presentation, etc.

Optionally, the milestone content component 120 can receive a milestone indicator. In some embodiments, the milestone indicator is a symbol indicative of the fact that a version item in a file history has a milestone and milestone content associated with the version. In some embodiments, the milestone indicator and the milestone content are the same. For example, the milestone content and the milestone indicator can be a textual note ("draft saved before vacation").

In some embodiments, the milestone indicator is generated by the milestone content component 120 based upon the received milestone content. For example, for milestone content comprising an audio file, the milestone content component 120 can generate a milestone indicator indicative of the milestone content ("embedded 30 second audio").

In some embodiments, the milestone indicator is received from a user (e.g., user-selected milestone indicator from a palette of milestone indicators). In some embodiments, the milestone indicator can provide textual information describing milestone content (e.g., rich content such as audio, image(s), video(s), etc.). In some embodiments, the milestone indicator can provide textual information regarding significance of the milestone (e.g., "Presentation as presented during lunch meeting").

Once the milestone content has been received, the milestone storage component 130 can store the milestone content and, optionally, the milestone indicator in a milestone store 140. The milestone storage component 130 can further associate the milestone content, a milestone indicator (optionally), and the particular version of the electronic file.

In some embodiments, the milestone content, and, optionally the milestone indicator are stored with the version of the electronic file (e.g., as metadata in the version of the electronic file). In some embodiments, the milestone content, and, optionally the milestone indicator, are stored in as part of a file directory (e.g., additional property on versions that allows for rich content to be stored). In some embodiments, the milestone content, and, optionally the milestone indicator, are stored in a separate data store (e.g., database). In some embodiments, the milestone content, and, optionally the milestone indicator, are an activity type in a cloud-based activity store. For example, the activity type can allow a user to attach rich content media, as described previously.

Figure 3:
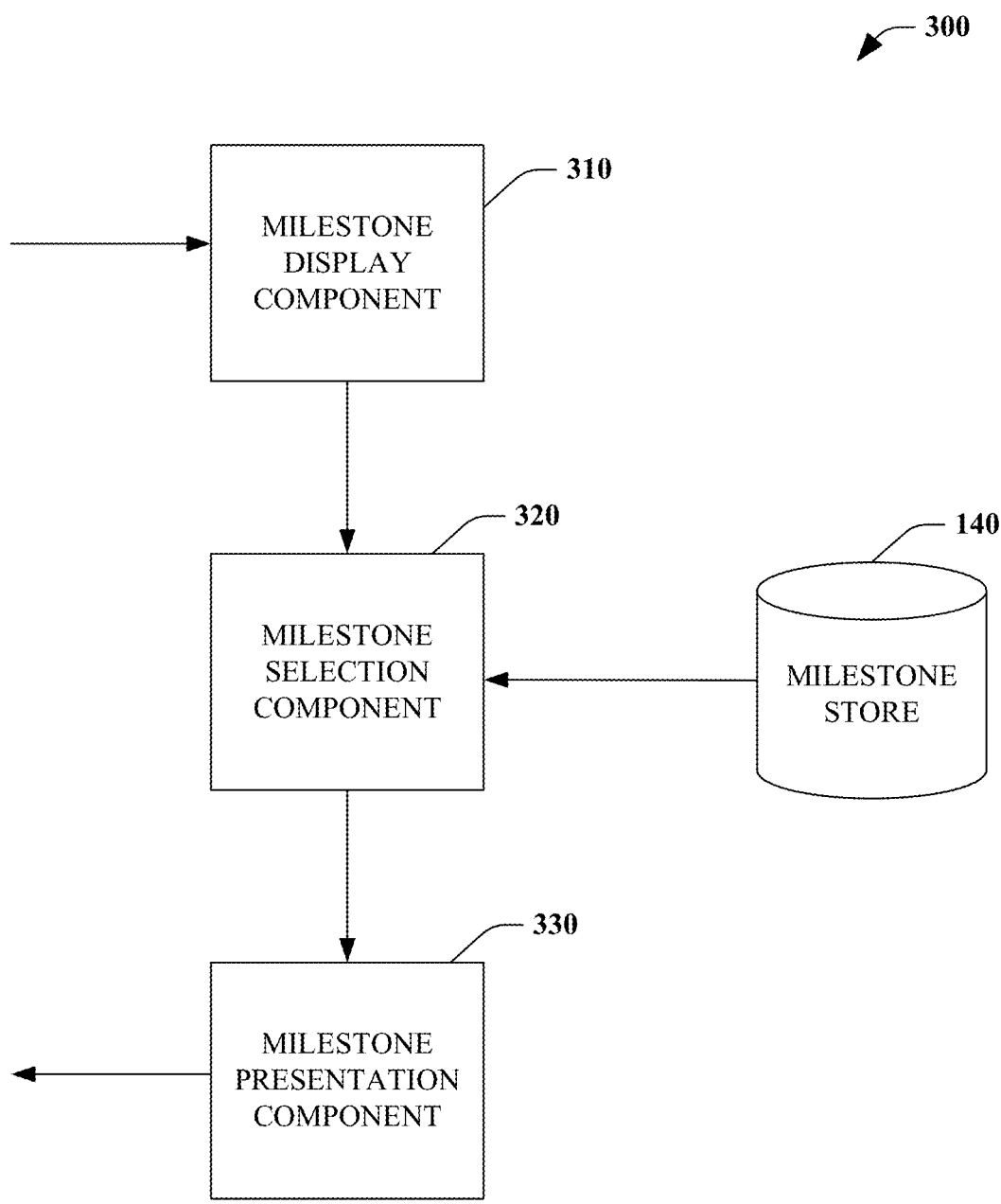
FIG. 3 is a functional block diagram that illustrates a system for using a milestone associated with a version of an electronic file.

Referring to FIG. 3, a system for using a milestone associated with a version of an electronic file 300 is illustrated. In some embodiments, the system 300 can be utilized by a user to selectively retrieve milestone(s) in a history of versions of the electronic file.

The system 300 includes a milestone display component 310 that displays one or more milestone indicators. Each milestone indicator is associated with a milestone of a version of an electronic file.

In some embodiments, the milestone indicator(s) comprise a graphical element displayed in a version history. The graphical element is indicative of a milestone attached to a particular version of the file. In some embodiments, the milestone indicator(s) comprise information regarding associated milestone content. By way of example and not limitation, in some embodiments, a milestone indicator of a bell symbol can be used to denote audio file(s), a milestone indicator of a photo frame can be used to denote image file(s), a milestone indicator of a film spool can be used to denote video file(s), and the like.

In some embodiments, the milestone display component 310 displays milestone indicators(s) associated with versions of a particular electronic file. In some embodiments, the milestone display component 310 displays milestone indicators(s) associated with versions of a plurality of files. In some embodiments, the milestone display component 310 displays milestone indicators(s) associated with a particular user (e.g., "my milestones"). In some embodiments, for a user with access to file(s) of one or more particular other user(s), the milestone display component 310 displays milestone indicators(s) associated with one or more particular other user(s) ("Joanie's milestones").

In some embodiments, the milestone display component 310 includes a search function that allows the user to search milestone indicator(s) and/or milestone content. For example, using the search function, a user can search for milestone(s) having one or more keywords (e.g., "presentation"), a particular date range, a particular time range, and the like. In some embodiments, the milestone display component 310 can perform optical character recognition (OCR) on image file(s) and/or frame(s) of video file(s) as part of the search function to determine milestone(s) responsive to a user submitted search.

In some embodiments, the milestone display component 310 can perform object and/or facial recognition on image file(s) and/or frame(s) of video file(s) as part of the search function. In some embodiments, the milestone display component 310 can perform voice recognition and/or speech-to-text as part of the search function.

The system 300 further includes a milestone selection component 320 that receives selection of a particular milestone indicator. Referring to FIG. 2, the graphical user interface 200 includes milestone indicators 220. The graphical user interface 200 further includes a "view milestone" control 230 which a user can select to view milestone content associated with the milestone.

Returning to FIG. 3, the system 300 further includes a milestone presentation component 330 that presents milestone content associated with the selected particular milestone indicator.

Figure 4:
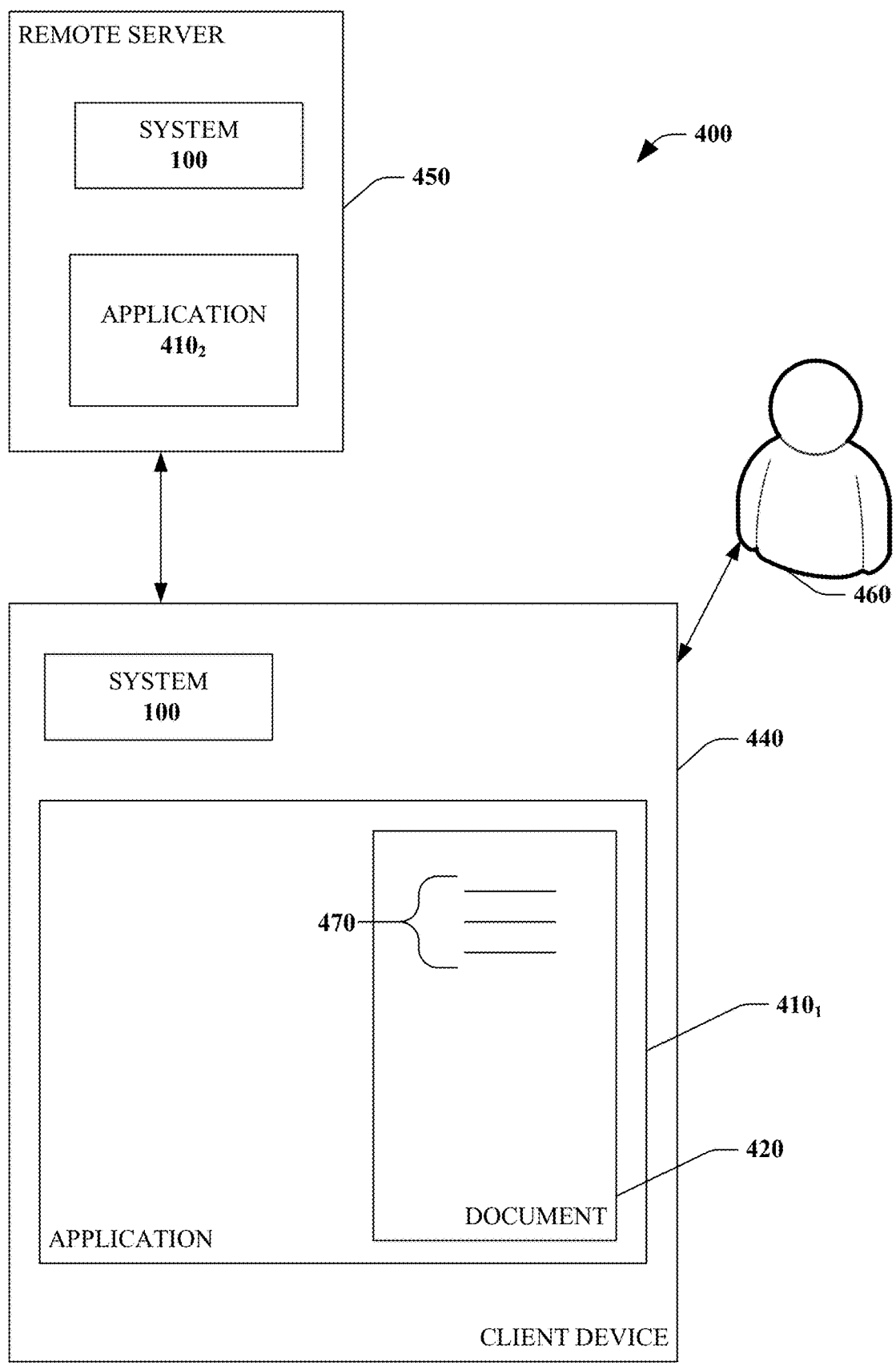
FIG. 4 is a functional block diagram that illustrates a system for creating a milestone.

Turning to FIG. 4, a system for creating a milestone 400 is illustrated. The system 400 includes an application $410_1$, $410_2$ (generally, 410) used to view, generate, and/or edit an electronic document 420 (e.g., electronic file). Examples of suitable applications 410 include, but are not limited to, word processing, spreadsheet, database, slide presentation, electronic mail, drawing, note taking, web browser, media player, and game applications.

In some embodiments, the application $410_1$ is a thick client application stored locally on a client device 440. In some embodiments, the application $410_2$ is thin client application (i.e., web applications) that resides on a remote service 450 and accessible over a network or combination of networks (e.g., the Internet, wide area networks, local area networks). A thin client application $410_2$ can be hosted in a browser-controlled environment or coded in a browser-supported language and reliant on a common web browser to render the application executable on the client device 440.

A user 460 can use the application 410 to create a new document 420, edit an existing document 420, and/or view an existing document 420. The application 410 receives input from the user 460, for example, text input, from one or more input devices including, for example, a keyboard, a computer mouse, a remote control. In some embodiments, the application 410 receives input from the user 460 through a Natural User Interface (NUI) which enables the user to interact with the client device 440 in a natural manner. Examples of NUI include speech recognition, touch and stylus recognition, gesture recognition both on screen and adjacent to the screen, air gestures, head and eye tracking, voice and speech, vision, touch, hover, gestures, machine intelligence, and the like.

The user input results in content 470 being added to the document 420. In some embodiments, content 470 is added within a document canvas (e.g., a page in a word processing document, a spreadsheet in a spreadsheet document, a slide in a presentation document) of the document 420.

The system 400 can include the system 100 that creates a milestone associated with a version of the document 420. In some embodiments, the system 100 executes on the remote server 450. In some embodiments, the system 100 executes on the client device 440.

Figure 5:
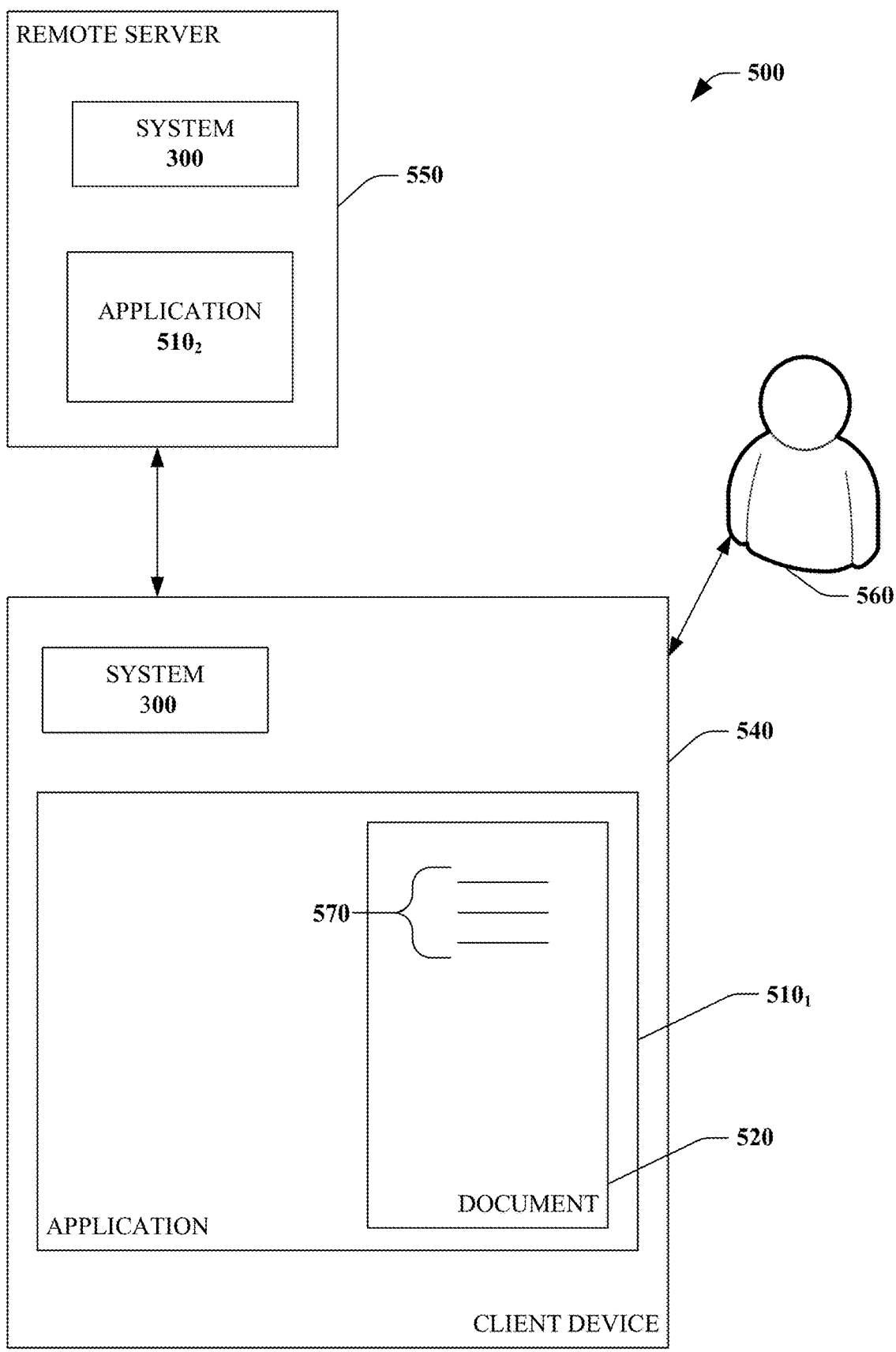
FIG. 5 is a functional block diagram that illustrates a system for using a milestone.

Turning to FIG. 5, a system for using a milestone 500 is illustrated. The system 500 includes an application $510_1$, $510_2$ (generally, 510) used to view, generate, and/or edit an electronic document 520 (e.g., electronic file). Examples of suitable applications 510 include, but are not limited to, word processing, spreadsheet, database, slide presentation, electronic mail, drawing, note taking, web browser, media player, and game applications.

In some embodiments, the application $510_1$ is a thick client application stored locally on a client device 540. In some embodiments, the application $510_2$ is thin client application (i.e., web applications) that resides on a remote service 550 and accessible over a network or combination of networks (e.g., the Internet, wide area networks, local area networks). A thin client application $510_2$ can be hosted in a browser-controlled environment or coded in a browser-supported language and reliant on a common web browser to render the application executable on the client device 540.

A user 560 can use the application 510 to create a new document 520, edit an existing document 520, and/or view an existing document 520. The application 510 receives input from the user 560, for example, text input, from one or more input devices including, for example, a keyboard, a computer mouse, a remote control. In some embodiments, the application 510 receives input from the user 560 through a Natural User Interface (NUI) which enables the user to interact with the client device 540 in a natural manner. Examples of NUI include speech recognition, touch and stylus recognition, gesture recognition both on screen and adjacent to the screen, air gestures, head and eye tracking, voice and speech, vision, touch, hover, gestures, machine intelligence, and the like.

The user input results in content 570 being added to the document 520. In some embodiments, content 570 is added within a document canvas (e.g., a page in a word processing document, a spreadsheet in a spreadsheet document, a slide in a presentation document) of the document 520.

The system 500 can include the system 300 that uses a milestone associated with a version of an electronic file with the document 520. In some embodiments, the system 300 executes on the remote server 550. In some embodiments, the system 300 executes on the client device 540.

Figure 6:
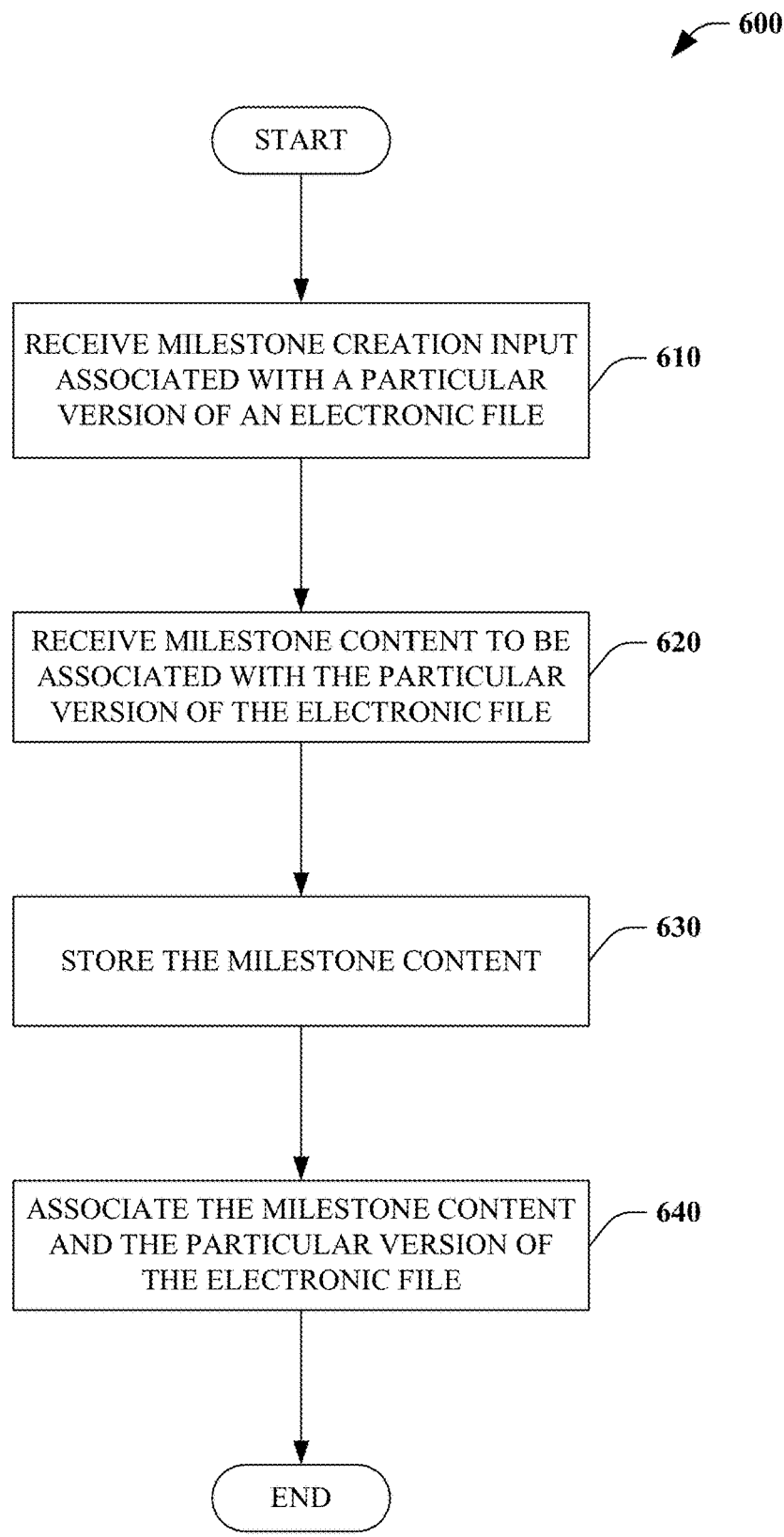
FIG. 6 illustrates an exemplary method of creating a milestone associated with a version of an electronic file.
Figure 7:
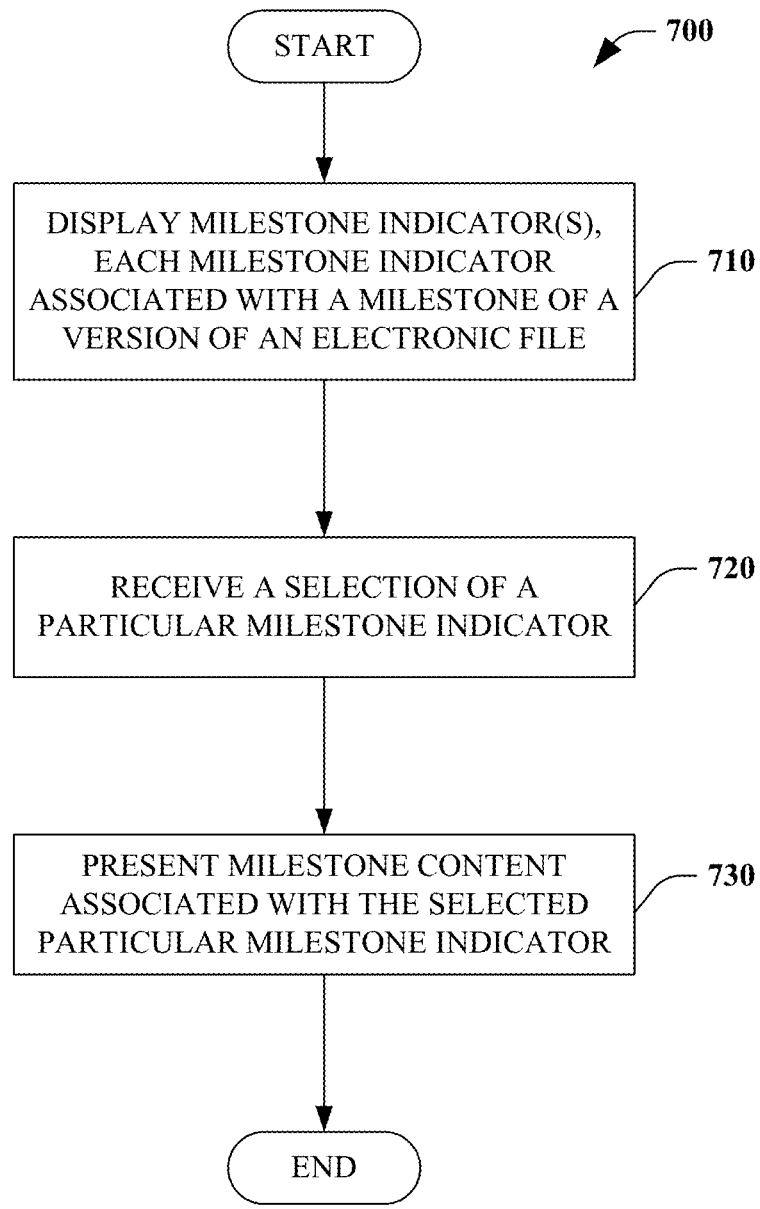
FIG. 7 illustrates an exemplary method of using a milestone associated with an electronic file.
Figure 8:
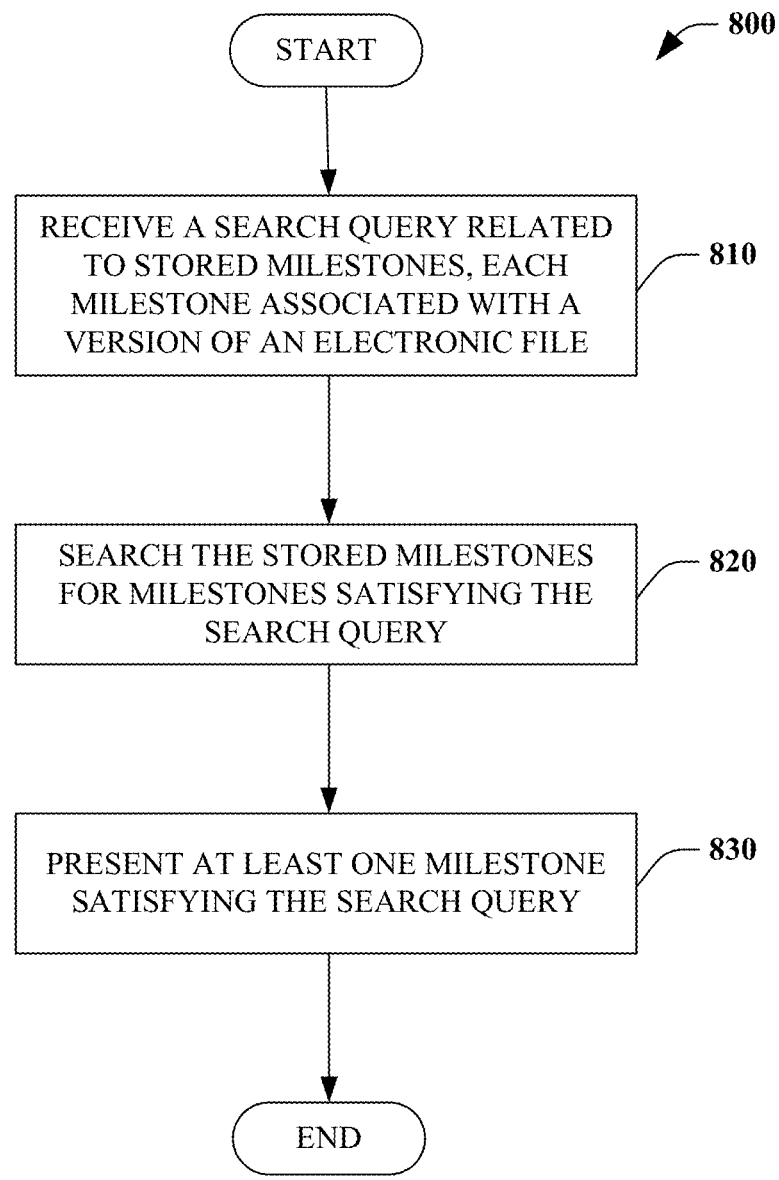
FIG. 8 illustrates another exemplary method of using a milestone associated with an electronic file.

FIGS. 6-8 illustrate exemplary methodologies relating to creating and/or using milestone(s) associated with electronic file(s). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 6, a method of creating a milestone associated with a version of an electronic file 600 is illustrated. In some embodiments, the method 600 is performed by the system 100.

At 610, a milestone creation input associated with a particular electronic file is received. In some embodiments, the milestone creation input is explicit. In some embodiments, the milestone creation input is implicit.

At 620, milestone content is received. In some embodiments, the milestone content comprises text. In some embodiments, the milestone content comprises video file(s), audio file(s), image file(s), and/or attachment of other electronic file(s).

At 630, the milestone content is stored. At 640, the milestone content and the particular version of the electronic file are associated.

Turning to FIG. 7, a method of using a milestone associated with an electronic file 700 is illustrated. In some embodiments, the method 700 is performed by the system 300.

At 710, milestone indicator(s) are displayed, each milestone indicator associated with a milestone of a version of an electronic file. At 720, selection of a particular milestone indicator is received. At 730, milestone content associated with the selected particular milestone indicator is presented.

Referring next to FIG. 8, a method of using a milestone associated with an electronic file 800 is illustrated. In some embodiments, the method 800 is performed by the system 300.

At 810, a search query related to stored milestones is received, each milestone associated with a version of an electronic file. At 820, the stored milestones (e.g., milestone metadata, milestone content and/or milestone indicator) are searched for milestones satisfying the search query. At 830, milestone(s) (e.g., milestone content, milestone indicator(s), and/or version(s) of electronic file(s)) satisfying the search query are presented.

Described herein is a system for creating a milestone associated with a version of an electronic file, comprising: a computer comprising a processor and a memory having computer-executable instructions stored thereupon which, when executed by the processor, cause the computer to: receive a milestone creation input associated with the particular version of the electronic file; receive milestone content to be associated with the particular version of the electronic file; store the milestone content; and, associate the stored milestone content and the particular version of the electronic file. The system can further include wherein the milestone creation input is received explicitly from a user using a graphical user interface. The system can include wherein the milestone creation input is inferred based upon user activity related to the electronic file.

The can include the memory having further computer-executable instructions stored thereupon which, when executed by the processor, cause the computer to: associate a milestone indicator with the stored milestone content and the particular version of the electronic file. The system can further include wherein the milestone indicator is one of a symbol or a user-selected milestone indicator selected from a palette of milestone indicators. The system can further include wherein the milestone indicator is generated based upon the received milestone content.

The system can further include wherein the milestone content comprises text. The system can include wherein the milestone content comprises at least one of a video file, an audio file, an image file or another electronic file.

Described herein is a method for using a milestone associated with a version of an electronic file, comprising: displaying one or more milestone indicators, each milestone indicator associated with a milestone of a version of an electronic file; receiving a selection of a particular milestone indicator; and presenting milestone content associated with the selected particular milestone indicator. The method can further include wherein the milestone indicators are associated with versions of a particular electronic file.

The method can further include wherein the milestone indicators are associated with versions of a plurality of electronic files. The method can include wherein the milestone indicators displayed are associated with a particular user. The method can further include wherein the milestone indicator is one of a symbol or a user-selected milestone indicator selected from a palette of milestone indicators.

The method can include wherein the milestone indicator is indicative of associated milestone content. The method can further include wherein the milestone content comprises text. The method can include wherein the milestone content comprises at least one of a video file, an audio file, an image file or another electronic file.

Described herein is a computer storage media storing computer-readable instructions that when executed cause a computing device to: receive a search query related to stored milestones, each milestone associated with a version of an electronic file; search the stored milestones for milestones satisfying the search query; and present at least one milestone satisfying the search query. The computer storage media can store further computer-readable instructions that when executed cause the computing device to: when searching the stored milestones, utilize optical character recognition on content of at least one milestone, the content comprising at least one of an image file or a frame of a video file.

The computer storage media can store further computer-readable instructions that when executed cause the computing device to: when searching the stored milestones, utilize speech-to-text on content of at least one milestone, the content comprising an audio file. The computer storage media can further include wherein the stored milestones comprises at least one of milestone metadata, milestone content, or milestone indicators.

Figure 9:
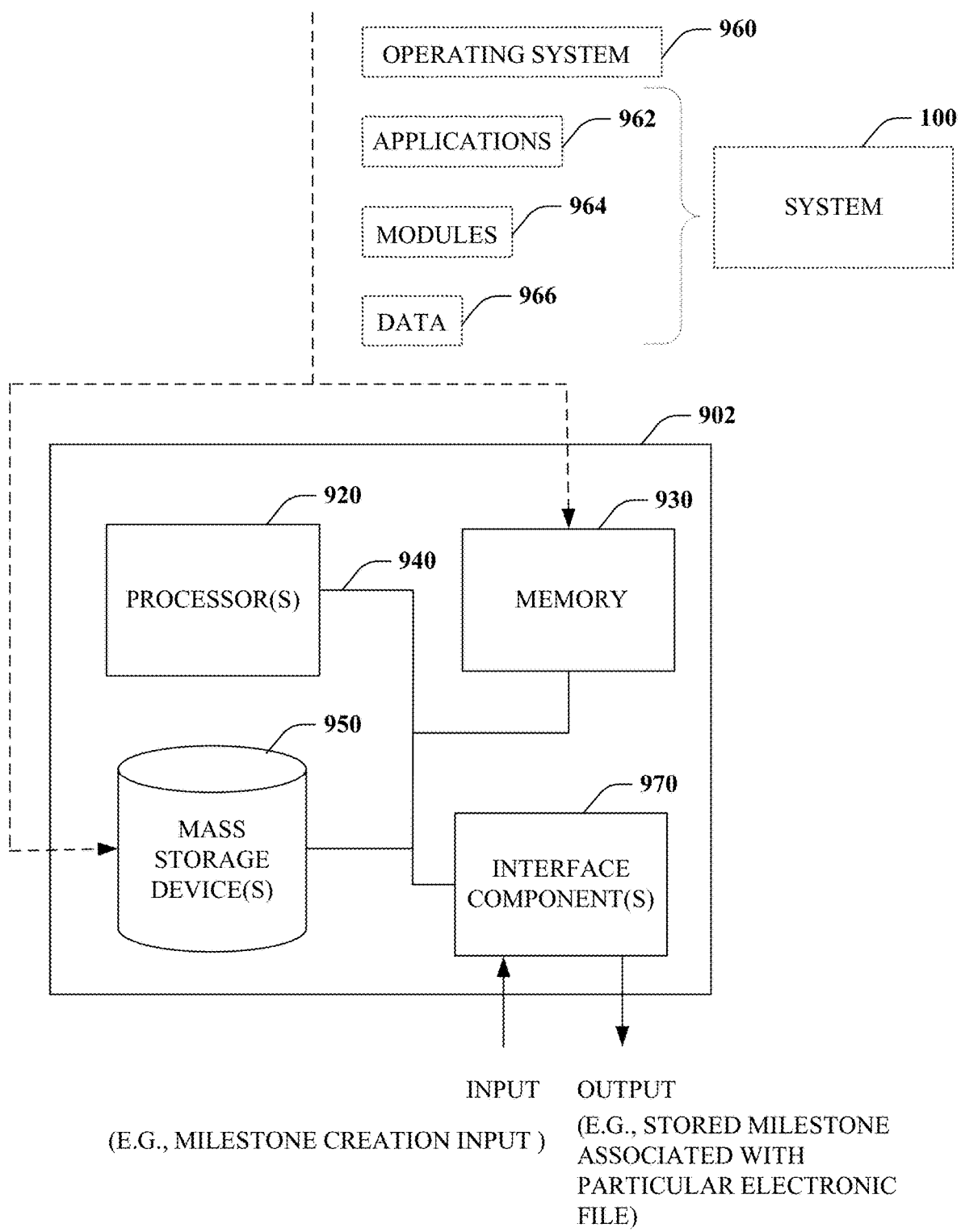
FIG. 9 is a functional block diagram that illustrates an exemplary computing system.

With reference to FIG. 9, illustrated is an example general-purpose computer or computing device 902 (e.g., mobile phone, desktop, laptop, tablet, watch, server, handheld, programmable consumer or industrial electronics, set-top box, game system, compute node, etc.). For instance, the computing device 902 may be used in the system 100 and/or the system 300.

The computer 902 includes one or more processor(s) 920, memory 930, system bus 940, mass storage device(s) 950, and one or more interface components 970. The system bus 940 communicatively couples at least the above system constituents. However, it is to be appreciated that in its simplest form the computer 902 can include one or more processors 920 coupled to memory 930 that execute various computer executable actions, instructions, and or components stored in memory 930. The instructions may be, for instance, instructions for implementing functionality described as being carried out by one or more components discussed above or instructions for implementing one or more of the methods described above.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 920 can be a graphics processor.

The computer 902 can include or otherwise interact with a variety of computer-readable media to facilitate control of the computer 902 to implement one or more aspects of the claimed subject matter. The computer-readable media can be any available media that can be accessed by the computer 902 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 902. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 930 and mass storage device(s) 950 are examples of computer-readable storage media. Depending on the exact configuration and type of computing device, memory 930 may be volatile (e.g., RAM), non-volatile (e.g., ROM, flash memory, etc.) or some combination of the two. By way of example, the basic input/output system (BIOS), including basic routines to transfer information between elements within the computer 902, such as during start-up, can be stored in nonvolatile memory, while volatile memory can act as external cache memory to facilitate processing by the processor(s) 920, among other things.

Mass storage device(s) 950 includes removable/non-removable, volatile/non-volatile computer storage media for storage of large amounts of data relative to the memory 930. For example, mass storage device(s) 950 includes, but is not limited to, one or more devices such as a magnetic or optical disk drive, floppy disk drive, flash memory, solid-state drive, or memory stick.

Memory 930 and mass storage device(s) 950 can include, or have stored therein, operating system 960, one or more applications 962, one or more program modules 964, and data 966. The operating system 960 acts to control and allocate resources of the computer 902. Applications 962 include one or both of system and application software and can exploit management of resources by the operating system 960 through program modules 964 and data 966 stored in memory 930 and/or mass storage device (s) 950 to perform one or more actions. Accordingly, applications 962 can turn a general-purpose computer 902 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 962, and include one or more modules 964 and data 966 stored in memory and/or mass storage device(s) 950 whose functionality can be realized when executed by one or more processor(s) 920.

In accordance with one particular embodiment, the processor(s) 920 can correspond to a system on a chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 902 also includes one or more interface components 970 that are communicatively coupled to the system bus 940 and facilitate interaction with the computer 902. By way of example, the interface component 970 can be a port (e.g., serial, parallel, PCMCIA, USB, FireWire, etc.) or an interface card (e.g., sound, video, etc.) or the like. In one example implementation, the interface component 970 can be embodied as a user input/output interface to enable a user to enter commands and information into the computer 902, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 970 can be embodied as an output peripheral interface to supply output to displays (e.g., LCD, LED, plasma, etc.), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
    a processor; and
    a memory having computer-executable instructions stored thereupon which, when executed by the processor, cause the system to:
    display a version history of an electronic document, the version history including a most recent version and multiple previous versions of the electronic document shown in chronological order, the version history including a first graphical indicator displayed adjacent to a first previous version of the electronic document shown in a first position in the chronological order, the first graphical indicator conveying that a first video, audio, or image file, separate from the electronic document, has been associated with the first previous version of the electronic document;
    receive a milestone creation input associated with a second previous version of the electronic document that is shown in a second position in the chronological order of the version history; and
    in response to the milestone creation input:
        identify a second video, audio, or image file that is separate from the electronic document;
        associate the second video, audio, or image file with the second previous version of the electronic document; and
        populate the version history of the electronic document with a second graphical indicator adjacent to the second previous version of the electronic document, the second graphical indicator conveying that the second video, audio, or image file, separate from the electronic document, has been associated with the second previous version of the electronic document, the version history being populated while the first previous version remains in the first position in the chronological order and the second previous version remains in the second position in the chronological order.

2. The system of claim 1, the memory having further computer-executable instructions stored thereupon which, when executed by the processor, cause the system to:
    display a milestone creation control with the version history, the milestone creation control providing functionality for associating separate files with individual versions of the electronic document; and
    receive the milestone creation input explicitly via the milestone creation control displayed with the version history.

3. The system of claim 1, the memory having further computer-executable instructions stored thereupon which, when executed by the processor, cause the system to:
    infer the milestone creation input based at least upon user activity indicative of user intent to associate a separate file with the second previous version of the electronic document.

4. The system of claim 1, the memory having further computer-executable instructions stored thereupon which, when executed by the processor, cause the system to:
    infer the milestone creation input based at least on user activity indicative of user intent to associate a separate file with the second previous version, wherein the user activity involves sending or receiving the electronic document via email.

5. The system of claim 1, the memory having further computer-executable instructions stored thereupon which, when executed by the processor, cause the system to:
- display a palette of available milestone indicators comprising different graphical indications that separate files have been associated with corresponding document versions;
- receive input identifying the second graphical indicator from the palette; and
- associate the second graphical indicator with the second previous version of the electronic document responsive to the input identifying the second graphical indicator from the palette.

6. The system of claim 1, the memory having further computer-executable instructions stored thereupon which, when executed by the processor, cause the system to:
- generate the second graphical indicator for the second previous version of the electronic document based at least upon the second video, audio, or image file that is separate from the electronic document.

7. A computer-implemented method, comprising:
- displaying a version history of an electronic document, the version history including a most recent version and multiple previous versions of the electronic document shown in chronological order, the version history including a first graphical indicator displayed adjacent to a first previous version of the electronic document shown in a first position in the chronological order, the first graphical indicator conveying that a first video, audio, or image file, separate from the electronic document, has been associated with the first previous version of the electronic document;
- populating the version history of the electronic document with a second graphical indicator adjacent to a second previous version of the electronic document, the second graphical indicator conveying that a second video, audio, or image file, separate from the electronic document, has been associated with the second previous version of the electronic document, the version history being populated while the first previous version remains in the first position in the chronological order and the second previous version remains in a second position in the chronological order;
- receiving a selection of the first graphical indicator from the displayed version history; and
- responsive to selection of the first graphical indicator from the displayed version history, presenting the first video, audio, or image content item associated with the first previous version of the electronic document.

8. The computer-implemented method of claim 7, further comprising:
- displaying last saved times in the version history indicating when individual versions of the electronic document were last saved.

9. The computer-implemented method of claim 8, wherein displaying the last saved times includes:
- displaying a first last saved time when the first previous version of the electronic document was saved in response to user input; and
- displaying a second last saved time when the second previous version of the electronic document was autosaved in the absence of explicit user input.

10. The computer-implemented method of claim 9, further comprising:
- displaying a third previous version of the electronic document in the version history between the first previous version and the second previous version without a corresponding graphical indicator to convey that the third previous version is not associated with separate video, audio, or image content.

11. The computer-implemented method of claim 7, further comprising:
- displaying a palette of graphical indicators;
- receiving a first input selecting the first graphical indicator from the palette for association with the first previous version of the electronic document; and
- receiving a second input selecting the second graphical indicator from the palette for association with the second previous version of the electronic document,
- the first graphical indicator and the second graphical indicator being different graphical indicators.

12. The computer-implemented method of claim 7, further comprising:
- defining a plurality of graphical symbols for different file types, including at least a first graphical symbol for audio file types, a second graphical symbol for video file types, and a third graphical symbol for image file types; and
- automatically selecting the first graphical indicator and the second graphical indicator from the plurality of graphical symbols based on respective file types of the first video, audio, or image file and the second video, audio, or image file.

13. A hardware computer storage media storing computer-readable instructions that, when executed, cause a computing device to:
- display a version history of an electronic document, the version history including a most recent version and multiple previous versions of the electronic document shown in chronological order, the version history including a first graphical indicator displayed adjacent to a first previous version of the electronic document shown in a first position in the chronological order, the first graphical indicator conveying that a first video, audio, or image file, separate from the electronic document, has been associated with the first previous version of the electronic document;
- populate the version history of the electronic document with a second graphical indicator adjacent to a second previous version of the electronic document, the second graphical indicator conveying that a second video, audio, or image file, separate from the electronic document, has been associated with the second previous version of the electronic document, the version history being populated while the first previous version remains in the first position in the chronological order and the second previous version remains in a second position in the chronological order;
- receive a search query;
- search the first video, audio, or image file and the second video, audio, or image file using the search query;
- determine that the first video, audio, or image file associated with the first previous version of the electronic document satisfies the search query; and
- present the first video, audio, or image file associated with the first previous version of the electronic document in response to the search query.

14. The hardware computer storage media of claim 13, storing further computer-readable instructions that, when executed, cause the computing device to:
- perform optical character recognition on image or video content of the first video, audio, or image file and the second video, audio, or image file to implement the search.

15. The hardware computer storage media of claim 13, storing further computer-readable instructions that, when executed, cause the computing device to:
utilize speech-to-text processing on audio content of the first video, audio, or image file and the second video, audio, or image file to perform the search.

16. The hardware computer storage media of claim 13, storing further computer-readable instructions that, when executed, cause the computing device to:
store the first video, audio, or image file and the second video, audio, or image file in a file directory.

17. The hardware computer storage media of claim 16, storing further computer-readable instructions that, when executed, cause the computing device to:
store the first video, audio, or image file in the file directory as a first property associated with the first previous version of the electronic document; and
store the second video, audio, or image file in the file directory as a second property associated with the second previous version of the electronic document.

18. The system of claim 1, the memory having further computer-executable instructions stored thereupon which, when executed by the processor, cause the system to:
display the version history with at least two autosaved versions of the electronic document that were autosaved at different times, and a user-saved version of the electronic document appearing between the at least two autosaved versions.

19. The system of claim 18, wherein the first previous version having the first graphical indicator is a first autosaved version of the electronic document, the second previous version having the second graphical indicator is a second autosaved version of the electronic document, and the user-saved version of the electronic document is displayed between the first autosaved version and the second autosaved version without a corresponding graphical indicator to convey that no separate video, audio, or image file has been associated with the user-saved version.

20. The system of claim 19, the memory having further computer-executable instructions stored thereupon which, when executed by the processor, cause the system to:
display the version history vertically with the most recent version of the electronic document shown at the top of the version history, the first autosaved version shown beneath the most recent version, the user-saved version of the electronic document shown below the first autosaved version, and the second autosaved version shown beneath the user-saved version.

* * * * *